Sept. 17, 1968 J. H. LEMELSON Re. 26,459

RADIO TELEPHONE COMMUNICATION SYSTEM

Original Filed Aug. 30, 1960

INVENTOR.
JEROME H. LEMELSON

United States Patent Office

Re. 26,459
Reissued Sept. 17, 1968

26,459

RADIO TELEPHONE COMMUNICATION SYSTEM

Jerome H. Lemelson, 85 Rector St.,
Metuchen, N.J. 08840

Original No. 3,198,888, dated Aug. 3, 1965, Ser. No. 52,826, Aug. 30, 1960. Application for reissue Apr. 18, 1966, Ser. No. 547,087
22 Claims. (Cl. 179—41)

Figure 1:
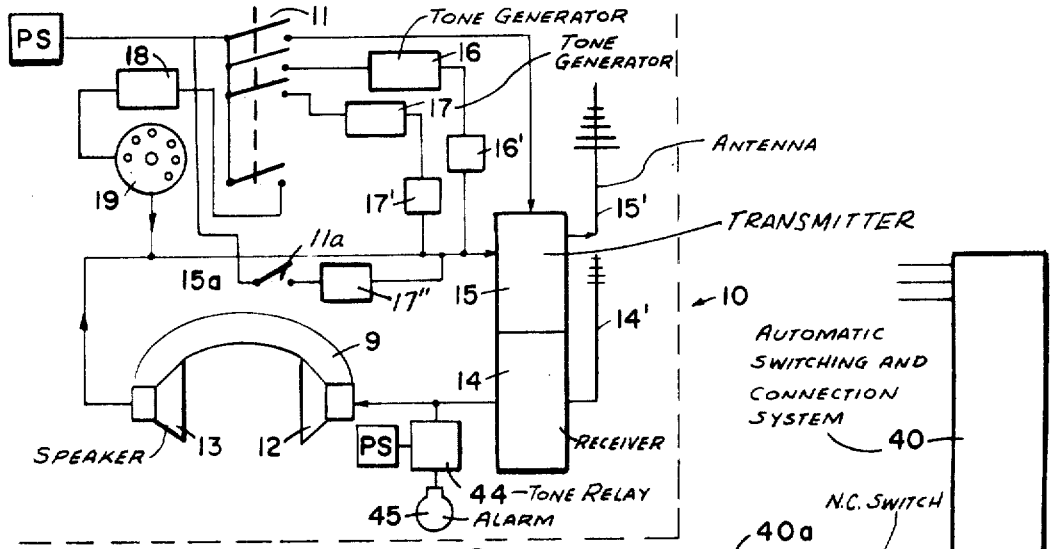

Matter enclosed in heavy brackets [ ] appears in the original patent but forms no part of this reissue specification; matter printed in italics indicates the additions made by reissue.

This invention relates to a communication system and in particular to apparatus for establishing a communication link between a short-wave transceiver and a remote terminal circuit of an automatic telephone system for the purpose of effecting voice communication between two stations only one of which is connected by wire to said telephone system.

It is known in the art to establish a telephone communication link between two parties at least one of whom is remote from any telephone line circuit, by means of short wave transmitting and receiving apparatus. If, for example, it is desired to avail a person in a motor vehicle with the communication services of a telephone switching system, a radio transmitter and receiver is provided with which the user communicates with a local telephone system operator who thereafter dials or otherwise establishes a desired communication link between said vehicle radio apparatus and a terminal circuit of the phone-wire system. Such a system requires not only human attendance at the telephone exchange to effect the desired circuit connection but also necessitates special transceiving equipment at the exchange which is capable of receiving and gating voice signals of different frequencies to respective telephone circuits. Such short wave wire phone service is not available in many areas of the world which do have conventional telephone wire service, primarily because the cost of installing and maintaining such equipment may not be economically justified in relation to the number of local subscribers to the service.

This invention is primarily concerned with a new and improved short wave signal and control system which may be used for voice communication with a party situated at a terminal circuit of an automatic telephone system without the need for special multi-channel transceiving equipment and the complex switching and circuit connection apparatus associated with a central control station using short wave apparatus to service a plurality of subscribers.

Another object of this invention is to provide a new and improved transceiving telephone system which does not require the attendance of a human operator to effect a communication link between a first person who is remote from his telephone and a second person at a telephone which is connectable to said first person's phone.

Another object is to provide a new and improved transceiver-telephone system which is relatively low in cost, simple to install and easy to operate.

Still another object is to provide an improved short wave telephone communication system which employs a conventional telephone switching system and which may be connected thereto without alteration to said switching system.

Another object is to provide simple apparatus permitting a person to both send and receive telephone calls by short wave through a particular telephone circuit, such as his own telephone, without altering his phone circuit or preventing it from being used for direct telephone dialling.

Another object is to provide an improved communication system which may be used in a plurality of ways including (a) communication between a first and a second party by means of short wave, (b) communication between a first and a third party by means of short wave and wire connection and (c) communication between a first, a second and a third party, each of which are at different locations by means of short wave and wire connections.

Still another object is to provide a simple device permitting the user of a telephone to leave the vicinity of his phone while remaining operatively connectable thereto by short wave means which includes a means for warning said phone user of an incoming call even though the user is beyond hearing range of the sound of his telephone bell or buzzer.

Another object is to provide an improved transceiver-telephone apparatus which employs a conventional telephone and its voice wire connection to an automatic switching and connection system for establishing a communication link with another terminal circuit of said system without substantially altering said voice-wire connection or switching system and without preventing its normal local operation in receiving and sending phone calls.

With the above and other objects in view as may hereafter more fully appear, the invention consists of the novel constructions, combinations and arrangements of parts as will be more fully described and illustrated in the accompanying drawings but it is to be understood that changes, variations and modifications may be resorted to which fall within the scope of the invention as claimed.

Figure 2:
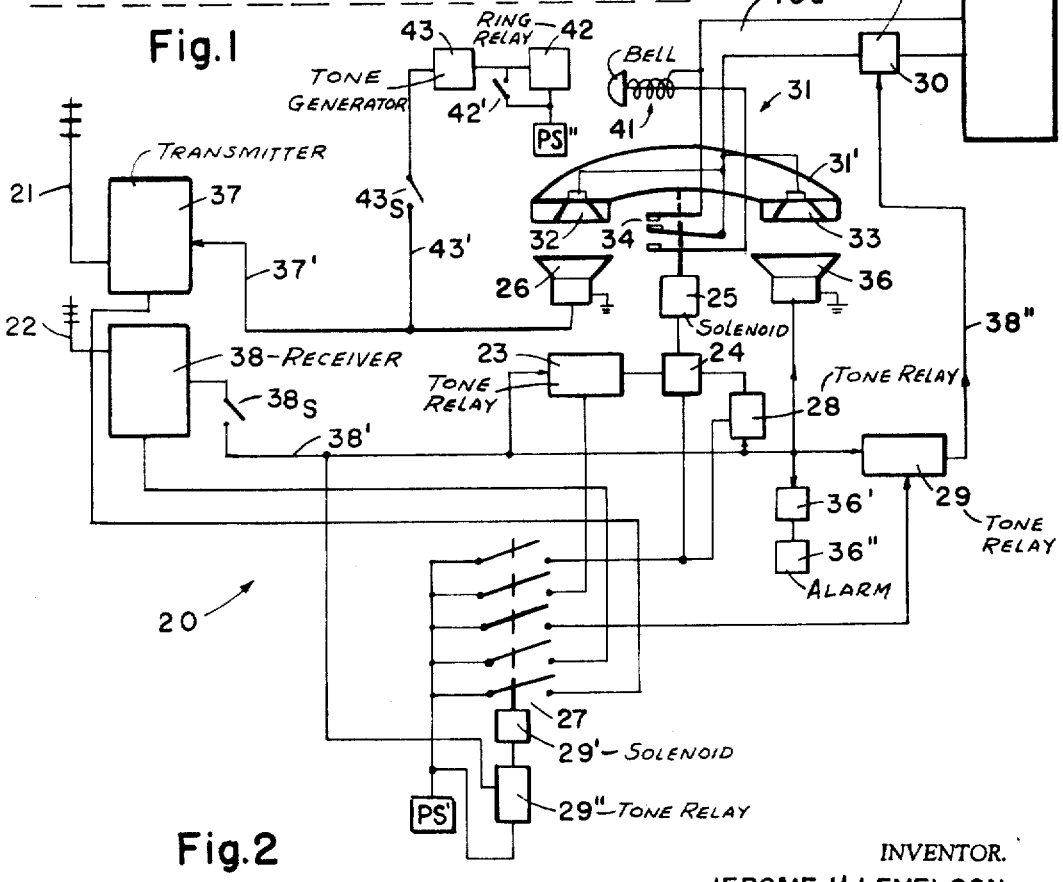

In the drawings:

FIG. 1 is a schematic view of a portable transceiving apparatus utilizable for voice communication with a second transceiving apparatus which is connectable to an automatic switching system and is illustrated in schematic form in FIG. 2.

The short wave transmitting and receiving apparatus of FIG. 1 and the illustrated controls and power supply PS therefor are referred to by the notation 10 and are preferably contained in a single portable housing adapted to be carried by a person or mounted in a vehicle and are adapted to transmit and receive voice communication signals from the transmitting-receiving apparatus 20 of FIG. 2. The primary function of the apparatus 10 is to effect the establishment of a voice communication link between any dialable voice pair terminal circuit or telephone line connected or connectable to an automatic switching system 40 by means of one telephone terminal circuit **40*a* of the system 40. In a preferred form of the invention this function is effected without major alteration to the terminal circuit 40*a* and without interruption in the normal operation of said circuit by a person who may desire to place a phone call therefrom. The aforesaid function of establishing the voice communication link between a person operating the apparatus 10 who is remote from the apparatus 20 of FIG. 2 is effected by first establishing a signal communication link via short wave, means between the apparatus 10 and certain auxiliary means at apparatus 20 provided to simulate the function of dialling a number from the telephone 31 connected to the circuit 40*a* thereof and thereafter establish a voice communication link between the speaker and earpiece of said telephone 31 with a respective earpiece 12 and speaker 13 of the apparatus 10 so that conversation may be effected between the operator of 10 and a person at another telephone in the system 40**.

The apparatus 10 comprises in part a radio transmitter 15 and a receiver 14 each connected to respective aerial means 15' and 14' for the transmission and receipt of signals between respective transmitting and receiving apparatus 37 and 38 situated at the station containing the telephone 31. Respective aerial means 21 and 22 respectively transmit and receive signals for transmitter 37 and receiver 38.

In establishing a communication link between the apparatus 10 and any phone in the system 40 other than telephone 31, the operator of apparatus 10 first closes a multi-pole, double throw switch 11. This connects a power supply or battery PS with a plurality of circuits including a radio receiver 14, a radio transmitter 15 and a plurality of tone generators 16, 17 and 18 each of which is adapted to generate a tone of a different frequency to which respective relays in the apparatus 20 are responsive. The tone generators 16 and 17 are each connectable to the signal input of the radio transmitter 15 by means of respective switches 16' and 17'. When the operator closes pushbutton switch 16', a tone signal of the duration the switch is closed passes therethrough and is transmitted from transmitter 15 to radio receiver 38, the output 38' of which is connected to the energizing input of a tone operated relay 23 which is responsive only to a tone of the characteristic generated by 16. Since the receiver 38 will also receive voice signals, the tone generated by 16 is preferably beyond the voice frequency range as are the tones of the other relays mentioned hereafter. The relay 23 is connected to a power supply PS' through a multi-pole switch 27 which may either have been manually closed by the operator of 10 upon leaving the vicinity of the apparatus 20 or by means of a push-pull solenoid 29' connected at all times to PS' and responsive to the signal generated by 16. When tone relay 23 becomes energized, it operates a switch 24 to close, connecting a solenoid 25 with PS', the operation of which effects the lifting of the housing 31' of the mouth and earpiece of the telephone 31 just enough away from the base of said telephone to permit the normally open line switch 34, connecting the speaker 32 and ear-piece or receiving transducer 33 of the telephone with the wire pair **40*a*, to close. Situated in the vicinity of the telephone but preferably in a manner so as not to interfere with its normal operation are a sound pick-up transducer or microphone 26 for transducing the sounds generated by 32 to electrical signals and a loudspeaker 36 which is connected to the output of radio receiver 38 and generates sounds for which are picked up by the mouthpiece 33** of the telephone. Reference is made to Patent 2,703,821 for details of a phone handset lifting mechanism and associated receiving and transmitting transducing apparatus.

Closing of monostable, slow-to-open switch 17' by the operator of 10 causes a tone signal of another characteristic to be transmitted to receiver 38, the output of which is also connected to a second tone responsive relay 28 which, upon becoming energized, opens switch 24 effecting the retraction of the monostable solenoid 25, the mechanism 25' of which upon retraction, lowers the headset 31' against the base of the telephone and the opening of the line circuit.

Also connected in circuit with the power supply PS when switch 11 is closed, is a third tone generator 18 adapted to generate a tone of different frequency than those generated by 16 and 17. The output of tone generator 18 is connected to the switching input of a normally open rotary dial switch 19. When switch 19 is operated by dialing, a train of pulses equivalent to the number dialled and of the tonal characteristic of generator 18, is generated on line **15*a* and transmitted by transmitter 15 to receiver 38 of apparatus 20. The output 38' of receiver 38 is also connected to the switching input of a tone relay operated switch 29 which gates a pulse of equivalent duration on its output 38'' each time it is energized by a pulse of the signal passed through switch 19 and generated by 18. The line 38'' is connected to the switching input of a normally closed switch 30 which is in that part of the terminal circuit 40*a* on which the dial tone is generated. Thus the pulse train formed by operating the rotary switch 19** effects the interruption of the dial tone in a manner simulating and obtaining the same results as the operation of the rotary dial switch of the telephone.

The apparatus 10 also includes a mouthpiece or microphone 13 and a speaker or earpiece 12 preferably in the form of a telephone headset or base 9' The input to 12 is connected to the output of the receiver 14 of 10 and the output of the microphone 13 is connected to the input of the transmitter 15. It is noted that the outpu of a tone relay 28 of apparatus 20 may be adapted to effect reversal of the push-pull solenoid 29' to open the switches of a bank 27 thereof when the operator of 10 has completed his call and operates tone relay 17.

It is thus seen that the operator of 10 may easily establish a voice communication link with any phone connectable to the automatic switching system 40 by conventional dialling means and a short wave link established between his apparatus 10 and terminal circuit 20 and the said control means shown such as the respective solenoids and relays provided in apparatus 20.

Two other aspects of the apparatus of FIGS. 1 and 2 are noted. If it is desired to effect the establishment of a communication link with the operator of apparatus 10 by the operator of any telephone connectable to 40 other than the phone 31, apparatus is provided in FIG. 2 which includes a relay 42 which is responsive to the noise generated when the bell 41 of the telephone 31 rings. The relay 42, when so energized, connects a power supply PS'' to a fourth tone generator 43, the output 43' of which is connected to the input 37' of the transmitter 37. The tone signal generated by 43 is received by the receiver 14 of 10 and is transmitted on its output **14*a* to a tone responsive relay 44 which, when energized thereby operates a light or buzzer 45 to indicate to the operator of 10 that the telephone bell 41 is ringing. The operator of 10 may then close the switch 16' after closing switch 11, which causes the tone generated by 16 to be transmitted to receiver 38, energizes tone responsive relay 23 and effects the operation of solenoid 25 which lifts the headpiece 31' away from its base, closes switch 34 and establishes a voice link with the line 40*a* whereby the incoming call may be received by the operator of 10**.

If communication is desired between a person near the phone 31 and the operator of 10, a switch 42' is provided for pulsing the tone generator 43 by connecting it with the power supply PS'' for a brief period of time which effects the operation of the light or buzzer 45 notifying the operator of 10 to take the necessary action to complete the circuit or communication link as described. The earpiece 26 and speaker 36 may be utilized for communication purposes by the person near phone 31 who may also be provided with an additional headset with respective speaker and earpiece in series with 26 and 36. Or means may be provided for further amplifying the sounds generated by 36 and increasing the sensitivity of the microphone 26 when such a two way communication is desired between a person at phone apparatus 20 and the person at portable apparatus 10. If the output of speaker 36 is sufficiently loud enough, its operation when a communication link is established between apparatus 10 and apparatus 20 by the operator of 10, may be sufficient to attract the attention of the person in the vicinity of apparatus 20 when the operator of 10 desires to converse with him.

[It is noted that the tone signal generating means 16, 17, 18 and 43 may be replaced by pulse code generators actuated by switch closure to transmit coded pulse trains and the tone responsive relay 23, 28, 29, 29'' and 44 may be replaced by coded relays each of which are responsive to said coded pulse trains.]

A number of variations in the apparatus of FIGS. 1 and 2 are noted. For example, should the operator of the apparatus 10 desire to communicate with a person at station 20 by short wave voice communication, he may close a switch 11a energizing a further tone generator 17''. A further tone responsive relay 36' is connected to the input 38' of station 20. The operation of relay 36' may sound a bell, buzzer or light 36'' for attracting the attention of a person in the vicinity of the apparatus 20. The switch 11a is preferably a pushbutton switch so that the operator may signal different persons at 20 without difficulty by pulsing 36' and 36'' thereby.

It is further noted that the tone signal generating means 16, 17, *17''*, 18 and 43 may be replaced by pulse code generators actuated by switch closure to transmit different pulse trains or codes and the tone responsive relays 23, 28, 29, 29'', 44 and 36' may be replaced by coded relays which are responsive to respective pulse trains or codes generated by respective of said generators. Notations 38S and 43S refer to manually operative SPST switches in the respective lines for disconnecting the input and output signal circuits with the respective transceiving apparatus.

The embodiments of the invention in which an exclusive privilege or property is claimed are defined as follows.

1. In an automatic communication system the combination of:

(a) an automatic telephone switching system having a plurality of terminal wire pairs connected thereto and connectable to each other by means of signals generated on any of said wire pairs, (b) a telephone connected to one of said wire pairs having a unitary mouth-earpiece which is movable from a predetermined position on said telephone whereby it [opens] *closes* a switch and connects the output of the ear and mouth piece of said telephone with said automatic switching system, (c) a coupling device associated with said telephone having electro-mechanical means adapted, when operated, to close said switch of said telephone, (d) a control means for operating said electro-mechanical means including a relay which is responsive to a predetermined signal received thereby which operates said electro-mechanical means, (e) a short wave receiver having an output connected to said relay, (f) portable control apparatus including a short-wave transmitter adapted for transmitting signals to the receiver of said coupling apparatus, (g) a second short wave transmitter located in the general vicinity of said telephone and adapted to receive and transmit voice signals generated at the speaker of said mouthpiece of said telephone, (h) a second short wave receiver at said portable control apparatus adapted to receive signals transmitted by said second short wave transmitter whereby to establish a communication link therewith, (i) means at said control apparatus for generating a plurality of selection and connection signals when manually operated, (j) means connected to the output of said receiver at said telephone for converting said selection and connection signals generated at said portable apparatus into signals generated on the output of said telephone in simulation of conventional selection and connection signals generated by conventional dial operated telephones, (k) relay means including means for generating a signal at said portable apparatus and relay means responsive thereto at said telephone coupling apparatus for actuating said electro-mechanical means to open the switch of said telephone and break the circuit therewith and said automatic switching system under the control of the operator of said portable apparatus when it is desired to disconnect a communication link.

2. An automatic communication system in accordance with claim 1, said electro-mechanical means comprising a push-pull solenoid positioned and adapted with a mechanism to lift said ear-mouthpiece of said telephone away from said telephone to permit the normally open switch thereof to close.

3. In a two way communication system utilizing an automatic telephone switching and connection system to establish a communication link between a first person remote from a first terminal circuit of said system and a person situated at a second terminal circuit thereof by means of short wave transmission between said first party and said first terminal circuit, the improvement which comprises a first portable transceiving apparatus carried by said first person, a transceiving apparatus located adjacent the telephone of said first terminal circuit, a lifting means operatively connected to the headpiece of the telephone of said first terminal circuit, a bi-stable electro-mechanical means for operating said lifting means to move said headpiece sufficiently to effect closure of its terminal circuit switch for operatively connecting it with said switching system, a plurality of transducing means adjacent said headpiece including a speaker transducer for transmitting sounds to the mouthpiece of said headpiece and a microphone transducer for converting sounds transmitted by the earpiece of said headpiece, to electrical signals, said speaker transducer being operatively connected to a receiver for signals transmitted by the transmitter of said first transceiving apparatus, control means at said first transceiving apparatus including a first relay means actuable by the operator thereof for generating a first control signal, a second relay operatively connected to the receiver of said second transceiving apparatus which is energizable by said first control signal, said second relay adapted upon becoming energized to energize said electro-mechanical means to cause said lifting of said headpiece, selection switching means at said first transceiver for generating a plurality of signals in the form of a first signal train, means at said second transceiver for receiving and converting said signal train to a pulse train of equivalent magnitude as said first signal train on the terminal circuit of said telephone which simulates a switching and connection pulse train at the automatic switching system means for operating said selection switching means a plurality of times whereby a circuit may be established between said first terminal circuit and any circuit in said system which is accessible to its telephone, and means for generating a final control signal at the termination of a telephone call, a relay responsive to said final control signal and adapted for operating said bi-stable electro-mechanical means to lower the telephone headpiece to open the circuit between said telephone and the automatic switching system.

4. Apparatus in accordance with claim 3, which includes a ring signal relay at said first terminal circuit which is responsive to the ring signal generated on its input line when a connection is being made therewith by means of said telephone switching and connection system, said ring signal relay being operatively connected to energize a signal generator which is operatively connected to the short wave transmitter for transmitting an indicator signal to said first transceiving apparatus when a ring signal is generated on said phone line, a transducing means at the first transceiving apparatus for transducing said indicator signal to a warning signal which the operator thereat may easily sense, said ring signal relay also being operatively connectable to the electro-mechanical means for lifting said phone headpiece to effect its lifting upon the receipt of a ring signal.

5. Apparatus in accordance with claim 4 including means for locally energizing said ring signal relay and signal generator for operating said transducing means to provide said warning signal to the operator thereof for initiating a communication link between a person at said first terminal circuit and said first transceiving apparatus by directly conversing through said transceiving apparatus.

6. In an automatic communication system the combination of:

(a) an automatic telephone switching system having a plurality of terminal wire pairs connected thereto and connectable to each other by means of signals generated on any of said wire pairs, (b) a telephone connected to one of said wire pairs having a unitary mouth-earpiece adapted to be connected into and out of operative relation with said automatic switching system, (c) a coupling device associated with said telephone having electro-mechanical means adapted, when operated, to move said mouth-earpiece of said telephone in a manner to close said switch thereof, (d) a control means for operating said electro-mechanical means including a relay which is responsive to a predetermined signal received thereby which operates said electro-mechanical means, (e) a first radio receiver having an output coupled to said telephone, (f) control apparatus including a first radio transmitter adapted for transmitting signals to said first receiver, (g) a second radio transmitter located in operative relation with said telephone and adapted to receive and transmit voice signals generated by said telephone, (h) and a second radio receiver at said control means adapted to receive signals transmitted by said second radio transmitter whereby to establish a communication link therewith, (i) means at said control apparatus for generating a plurality of selection and connection signals for transmission to said first receiver for coupling said telephone into operative relation with said automatic telephone switch system.

7. A radio-telephone communication system comprising:

(a) an automatic telephone switching system having a plurality of terminal wire pairs connected thereto and connectable to each other by means of signals generated on any of said wire pairs, (b) a telephone connected to one of said wire pairs having a unitary mouth-ear piece adapted to be connected into and out of operative relation with said automatic switching system, (c) a coupling device associated with said telephone having electro-mechanical means adapted, when operated, to move said mouth-ear piece of said telephone in a manner to close the telephone switch, (d) a control means for operating said electro-mechanical means including a relay which is responsive to a predetermined signal received thereby which operates said electro-mechanical means, (e) a first radio receiver including a speaker positioned adjacent the mouth piece of said telephone, (f) control apparatus situated remote from said telephone and including a first radio transmitter adapted for transmitting signals to said first receiver and a microphone operatively connected to said first transmitter, (g) a second radio transmitter, a microphone operatively connected to said second transmitter and located adjacent the ear piece of said telephone for generating signals in accordance with sounds received thereby, (h) a second radio receiver at said control means adapted to receive signals transmitted by said second radio transmitter whereby to establish a voice communication link therewith, (i) means operatively connected to said second transmitter for generating a tone signal in response to the generation of a calling signal on the input to said telephone, (j) second relay means operatively connected to said second receiver at said control means and adapted to become energized upon receipt of said tone signal, (k) a transducer connected to said second relay means for generating a warning signal to the operator of said control apparatus when a call signal is generated on the telephone line and (l) means at said control apparatus for generating and transmitting on said first radio transmitter a signal to said relay means for operating said electro-mechanical means to close the switch of said telephone and operatively couple the mouth-ear piece thereof with the adjacent microphone and speaker for establishing a two-way communication link between said telephone and said remote control apparatus.

*8. A radio-telephone communication system comprising:*

*(a) an automatic telephone switching system having a plurality of terminal circuits connected thereto and connectable to each other by means of signals generated on any of said terminal circuits,*

*(b) a telephone connected to one of said terminal circuits having a telephone switch and a unitary mouth-earpiece adapted to be connected into and out of operative relation with said automatic switching system upon the closing of said telephone switch,*

*(c) a coupling device associated with said telephone, having electro-mechanical means adapted, when operated, to close said telephone switch,*

*(d) a control means for operating said electro-mechanical means including a relay which is responsive to a predetermined signal received thereby which operates said electro-mechanical means,*

*(e) a first radio receiver including a speaker positioned adjacent the mouthpiece of said telephone,*

*(f) control apparatus situated remote from said telephone and including a first radio transmitter adapted for transmitting signals to said first receiver and a microphone operatively connected to said first transmitter,*

*(g) a second radio transmitter, a microphone operatively connected to said second transmitter and located adjacent the earpiece of said telephone for generating signals in accordance with sounds received thereby,*

*(h) a second radio receiver at said control means adapted to receive signals transmitted by said second radio transmitter whereby to establish a voice communication link therewith,*

*(i) said telephone including calling means responsive to the generation of an input calling signal,*

*(j) said calling means operatively connected to said second transmitter for transmitting a calling signal indication,*

*(k) said second receiver at said control apparatus operatively responsive to said calling signal indication for generating a warning signal to the operator of said control apparatus when a call signal is generated on the telephone line,*

*(l) means at said control apparatus for generating and transmitting on said first radio transmitter a signal to said relay means for operating said electro-mechanical means to close the switch of said telephone and operatively couple the mouth-earpiece thereof with the adjacent microphone and speaker for establishing a two-way communication link between said telephone and said remote control apparatus.*

*9. A radio-communication apparatus adapted to establish a remote linkage with a conventional automatic telephone switching system which includes a system connected telephone having a unitary mouth-earpiece, a telephone switch for connecting the mouth-earpiece into operative relation with the telephone system and a calling means responsive to the receipt of an input calling signal,*

*said apparatus comprising:*

*(a) a first and second installation, said first installation adapted for operation adjacent the telephone, and said second installation adapted for operation remote from the telephone,*

*(b) said first installation including a coupling device*

*having electro-mechanical means adapted, when operated to close the telephone switch,*

*(c) a control means for operating said electro-mechanical means including a relay which is responsive to a predetermined signal received thereby which operates said electro-mechanical means,*

*(d) a first radio receiver including a speaker positioned adjacent the mouthpiece of the telephone,*

*(e) said second installation including a first radio transmitter adapted for transmitting signals to said first receiver, and a microphone operatively connected to said first transmitter,*

*(f) a second radio transmitter, a microphone operatively connected to said second transmitter and located adjacent the earpiece of the telephone for generating signals in accordance with sounds received thereby,*

*(g) a second radio receiver at said second installation adapted to receive signals transmitted by said second radio transmitter whereby to establish a voice communication link therewith,*

*(h) said second transmitter operatively connected to the telephone calling means for transmitting a calling signal indication,*

*(i) said second receiver at said second installation operatively responsive to said calling signal indication for generating a warning signal to the operator of said second installation when a call signal is received at the telephone,*

*(j) means at said second installation for generating and transmitting on said first radio transmitter a signal to said relay means for operating said electro-mechanical means to close the telephone switch and operatively couple the mouth-earpiece thereof with the adjacent microphone and speaker for establishing a two-way communication link between said installations.*

*10. A communications system comprising, a remote radio transmitter-receiver system, an intermediate radio transmitter-receiver system, a telephone network including a plurality of telephone substations wherein the telephone substations have handset means and audio transducers therein for sound sensing and production, a bell ringing means at each of said substations, and cradle switch means in one of said substations, said cradle switch means being operative to connect telephone substations selectively to the telephone network, means at said remote radio transmitter-receiver for at will generating and transmitting telephone code pulses, means controlled by said telephone code pulses opening and closing said cradle switch means in response to the telephone code pulses from the remote radio transmitter-receiver system to thereby signal the number of a further telephone substation, means at the intermediate radio transmitter-receiver system for responding to the ringing of the selected telephone substation bell and communicating bell ringing information to the remote radio transmitter-receiver system, means at the remote radio transmitter-receiver system responsive to the bell ringing information from the intermediate radio transmitter-receiver system to produce a signal indicating that the last mentioned telephone substation bell is ringing, and means for coupling audio signals between the intermediate radio transmitter-receiver system and the telephone network via said one of said substations.*

*11. The combination of claim 10, wherein the means for opening and closing the cradle switch means is completely exterior to the telephone substation.*

*12. A communication system adapted for use as an extension of a telephone network including a plurality of telephone substations wherein the telephone substations have handset means and audio transducers therein for sound sensing and production, a bell ringing means at each of said substations, and cradle switch means in one of said substations, said cradle switch means being operable to connect other telephone substations selectively to the telephone network, comprising a remote radio transmitter-receiver system, an intermediate radio transmitter-receiver system, means at said remote radio transmitter-receiver for at will generating and transmitting telephone code pulses, means controlled by said code pulses for opening and closing said cradle switch means in response to the telephone code signal pulses from the remote radio transmitter-receiver to thereby signal the number of a further telephone substation, means at the intermediate transmitter-receiver system for responding to the ringing of the selected telephone substation bell and communicating bell ringing information to the remote radio transmitter-receiver system, means at the remote radio transmitter-receiver system responsive to the bell ringing information from the intermediate radio transmitter-receiver system to produce a signal indicating that the last mentioned telephone substation bell is ringing and means for coupling audio signals between the intermediate radio transmitter-receiver system and the last-mentioned telephone substation.*

*13. The combination of claim 12, wherein the means for opening and closing the cradle switch means is completely exterior to the telephone substation.*

*14. Apparatus for remotely controlling a telephone comprising, a remote radio transmitter-receiver, an intermediate radio transmitter-receiver system, a telephone substation having a cradle switch for switching the telephone substation to a telephone network, means at the remote radio transmitter-receiver system for generating a carrier signal and for pulse modulating the remote radio transmitter-receiver carrier signal with a predetermined audio signal in response to a telephone pulsing mechanism, and means controlled by the intermediate radio transmitter-receiver system for connecting the telephone substation via the cradle switch to a telephone network in response to the pulses from the remote radio transmitter-receiver system.*

*15. A communication system adapted for use as an extension of a telephone network including a network exchange and a plurality of telephone substations wherein the telephone substations have handset means and audio transducers therein for sound sensing and production, bell ringing means for ringing a bell, and switch means accessible from the exterior of a selected one of said telephone substations for connecting the latter telephone substation to a telephone network, comprising a remote radio transmitter-receiver system, an intermediate radio transmitter-receiver system, means at the remote radio transmitter-receiver system for pulse modulating the remote radio transmitter-receiver carrier signal with a predetermined audio signal in response to a telephone pulsing mechanism, means controlled by the intermediate radio transmitter-receiver system for connecting the selected one of said telephone substations via the switch means to the telephone network in response to the pulses from the remote radio transmitter-receiver system, means at the intermediate radio transmitter-receiver system for responding to the ringing of the telephone substation bell and communicating bell ringing information to the remote radio transmitter-receiver system, means at the remote radio transmitter-receiver system responsive to the bell ringing information from the intermediate radio transmitter-receiver system to produce a signal indicating that the telephone substation bell is ringing, and means for coupling audio signals between the intermediate radio transmitter-receiver system and the telephone network via the selected one of said telephone substations.*

*16. The combination of claim 15, including means at the intermediate radio transmitter-receiver system to produce a signal indicating that the telephone substation bell is ringing and means for coupling audio signals between the intermediate radio transmitter system and the telephone network via the selected one of said telephone substations.*

*17. In combination, a telephone substation having a handset and a cradle switch, first means for at will mechanically operating said cradle switch selectively into open and closed positions, a radio receiver, means responsive to reception of control signals by said radio receiver for actuating said first means, a remote transmitter, means including said remote transmitter for transmitting said control signals to said radio receiver, said radio receiver having a speaker, said speaker being located adjacent said handset, and means for transmitting voice signals via said remote transmitter, said receiver and said speaker to said handset, while said cradle switch is closed.*

*18. The combination according to claim 17, wherein said telephone substation includes a bell, a local radio transmitter, a remote receiver associated with said remote transmitter, and means responsive to said bell for transmitting bell signals via said local radio transmitter to said remote receiver.*

*19. The combination according to claim 18, wherein a dialing mechanism is included in said remote-transmitter for generating said control signals.*

*20. A radio-telephone communications system, comprising:*

*(a) an automatic telephone switching system, having a plurality of fixed location terminal circuits connected thereto and selectively connectable to each other by means of coded signals generated on any of said terminal circuits;*

*(b) and a portable control apparatus situated remote from one of said terminal circuits and connectable thereto by a wireless radio link, whereby the remotely situated portable control apparatus is connectable to said automatic switching system, to establish a communication link with a selectable other terminal circuit;*

*(c) said one telephone circuit including:*

*(1) a first audio communications means connected to said automatic switching system for receiving audio information from said automatic switching system, which information is generated at said other terminal circuit for transmission to said portable control apparatus; and presenting audio information, which is generated at said portable control apparatus and transmitted to said one terminal circuit, to said automatic switching system for selective routing to said other terminal circuit;*

*(2) a normally open telephone switch connected in the circuit between said automatic switching system and said first audio communication means which upon closing serves to connect said first audio communication means into operative relation with said automatic switching system;*

*(3) a selection signal generating means for presenting coded switching and connection signals to said automatic switching system for establishing the selective routing of audio information to the desired other terminal circuit;*

*(4) a call response means for generating a call signal responsive to the calling of said one terminal circuit from another terminal circuit;*

*(5) a first signal responsive means, responsive to the reception of a first tone signal originated at said portable control apparatus for operating said telephone switch to the closed position;*

*(6) a second signal responsive means, responsive to the reception of second tone signals originated at said portable control apparatus for operating said selection signal generating means and presenting coded switching and connection signals to the automatic switching system;*

*(7) a first radio receiver for receiving the audio information and control signals generated at said portable control apparatus and directing same to said: first audio communication means, first signal responsive means, and second signal responsive means;*

*(8) and a first radio transmitter for transmitting the audio information received from said automatic switching system and said call signal to said portable control apparatus;*

*(d) said portable control apparatus including:*

*(1) a second audio communications means;*

*(2) a second radio receiver for presenting audio information received from said first transmitter to said second audio communications means;*

*(3) a second radio transmitter for transmitting audio information originated at said second audio communication means to said first radio receiver;*

*(4) said radio transmitters and receivers establishing a simultaneous two-way voice communications link between said one terminal circuit and said portable control apparatus;*

*(5) a manually operable first tone signal generator for generating said first tone signal, which is transmitted to said first signal responsive means, via said second radio transmitter and first radio receiver, for operating said telephone switch to its closed position;*

*(6) a second manually operable tone signal generator for generating said second tone signals, which is transmitted to said second signal responsive means via said second radio transmitter and first radio receiver, for operating said selection signal generating means and presented coded switching and connection signals to the automatic switching system; and*

*(7) an alarm means responsive to the reception of the calling signal generated by said call response means, for generating a warning signal at said portable control apparatus when a call signal is received at said one terminal circuit.*

*21. In a radio-telephone communications system, as set forth in claim 20:*

*said portable control apparatus further including a third manually operable tone signal generator for generating a third tone signal;*

*said one terminal station including a third signal responsive means responsive to the reception of said third tone signal, via said second radio transmitter and first radio receiver, for operating said telephone switch to its open position, and thereby permitting the operator at the remote location to disconnect said first audio communications means from said automatic switching system when the call is completed.*

*22. In a radio-telephone communications system, as set forth in claim 21:*

*said first manually operable tone signal generator producing a tone signal of a first frequency;*

*said second manually operable tone signal generator producing tone signals of a second frequency; and*

*said third manually operable tone signal generator producing a tone signal of a third frequency.*

References Cited

The following references, cited by the Examiner, are of record in the patented file of this patent or the original patent.

UNITED STATES PATENTS

| | | | |
|---|---|---|---|
| 2,079,089 | 5/1937 | Varley | 179—1 |
| 2,703,821 | 3/1955 | Kopp et al. | 179—6 |
| 2,831,923 | 4/1958 | Block | 179—1 |
| 2,894,121 | 7/1959 | Phillips | 325—64 |
| 2,935,605 | 5/1960 | Mathieu | 179—41 |

WILLIAM C. COOPER, *Primary Examiner.*